United States Patent [19]

Patelli

[11] Patent Number: 4,524,567
[45] Date of Patent: Jun. 25, 1985

[54] MACHINE FOR MAKING, FILLING AND SEALING BAGS

[75] Inventor: Ferruccio Patelli, Bologna, Italy

[73] Assignee: MAPA - Società Per Azioni, Bologna, Italy

[21] Appl. No.: 413,235

[22] Filed: Aug. 31, 1982

[30] Foreign Application Priority Data

Sep. 11, 1981 [IT] Italy .................. 3524 A/81

[51] Int. Cl.³ .................. B65B 9/12
[52] U.S. Cl. .................. 53/552
[58] Field of Search .................. 53/552, 551, 550, 554, 53/555, 389, 373

[56] References Cited

U.S. PATENT DOCUMENTS

| | | | |
|---|---|---|---|
| 2,248,471 | 7/1941 | Stroop | 53/552 X |
| 2,603,928 | 7/1952 | Clark | 53/554 |
| 2,765,605 | 10/1956 | Brelsford et al. | 53/554 |
| 3,045,404 | 7/1962 | Wilson | 53/551 |
| 4,384,442 | 5/1983 | Pendleton | 53/554 |

FOREIGN PATENT DOCUMENTS

| | | |
|---|---|---|
| 2126498 | 3/1976 | Fed. Rep. of Germany . |
| 2318333 | 2/1977 | Fed. Rep. of Germany . |
| 289434 | 5/1929 | United Kingdom . |
| 948515 | 2/1964 | United Kingdom . |
| 1459690 | 12/1976 | United Kingdom . |
| 1566037 | 4/1980 | United Kingdom . |
| 2056940 | 3/1981 | United Kingdom . |
| 2096091 | 10/1982 | United Kingdom . |

Primary Examiner—Horace M. Culver
Attorney, Agent, or Firm—Karl F. Ross; Herbert Dubno

[57] ABSTRACT

A machine for making, filling and sealing bags containing liquid, pulverulent, granular and other noncoherent materials, which is of the type having a vertical operating structure comprising structure for the formation and advancing of a continuous tube of heat-sealable material and also for feeding the product which is to be packed and for the longitudinal and transverse heat-sealing of the tube containing the product to be packed. In a machine of this kind the advancing structure and the transversal heat-sealing structure are associated with a support controlled by a mechanism belonging to the continuous motion kinematic structure, the advancing structure being formed by two sector members having cylindrical surfaces and contrarotating tangentially to a plane containing the axis of descent of the tube of heat-sealable material, while the mechanism comprises a cyclic differentiator device for the transmission of the motion.

3 Claims, 4 Drawing Figures

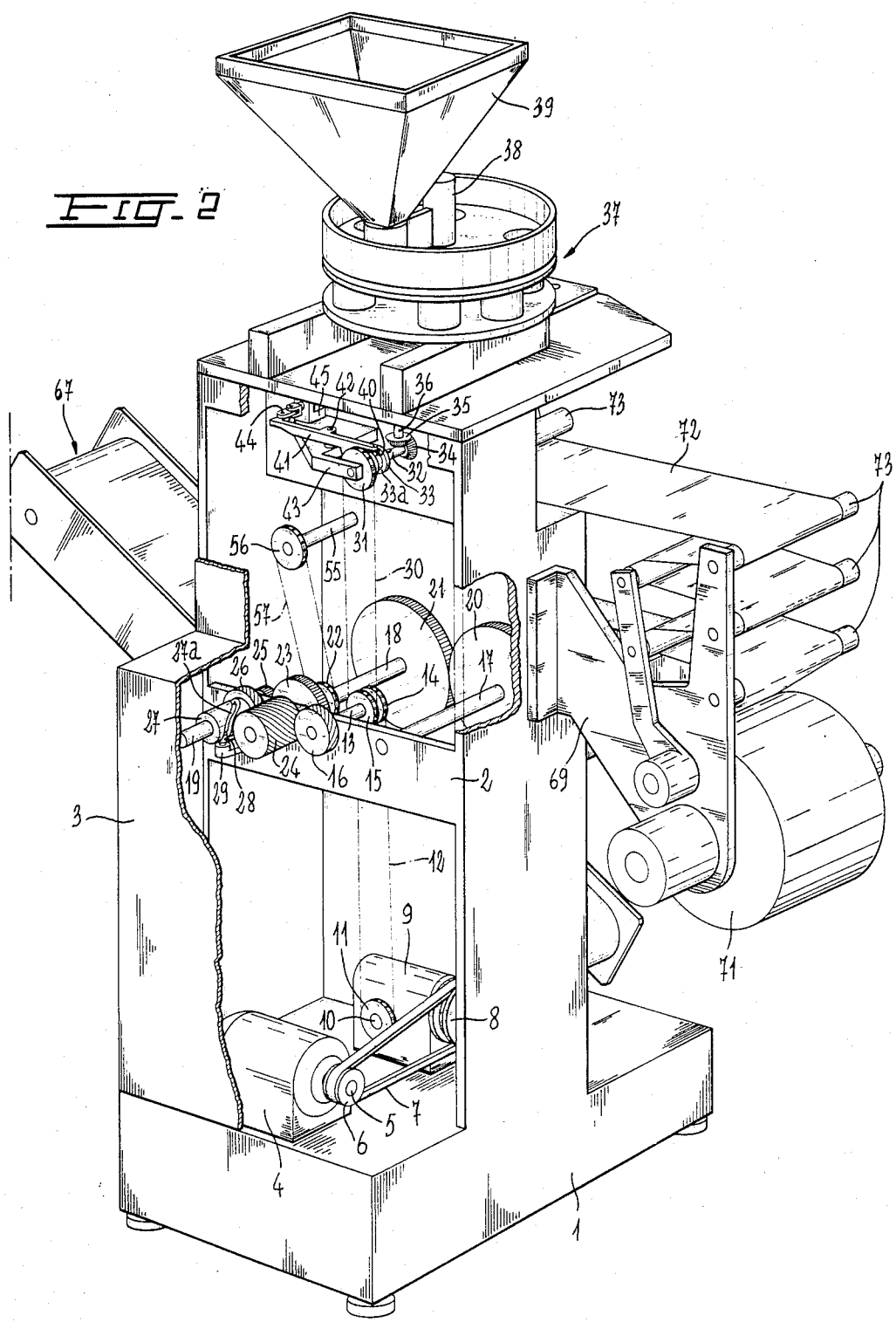

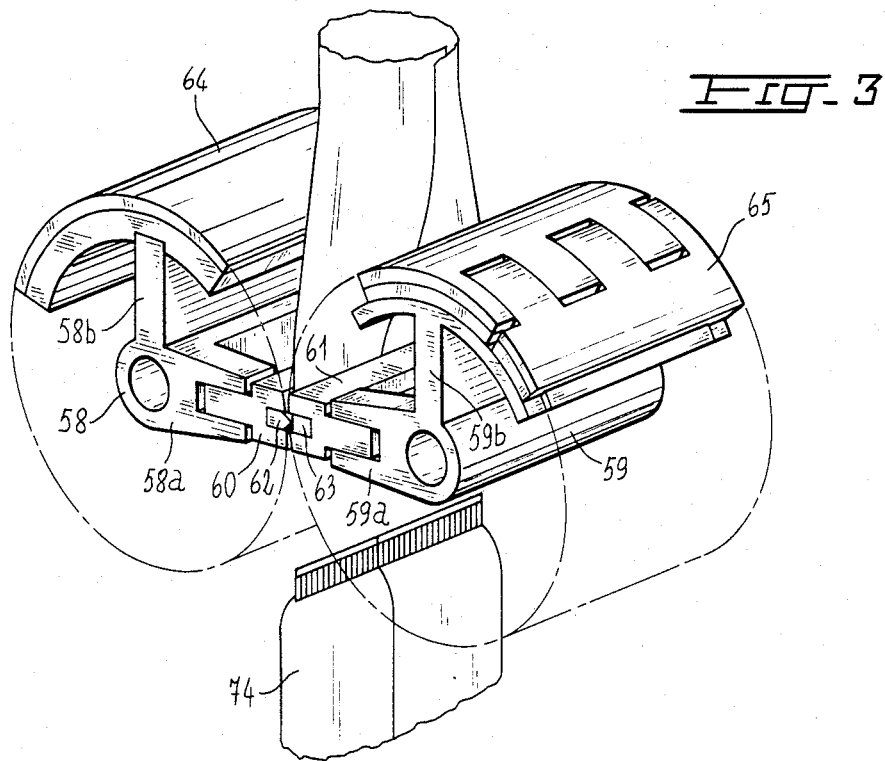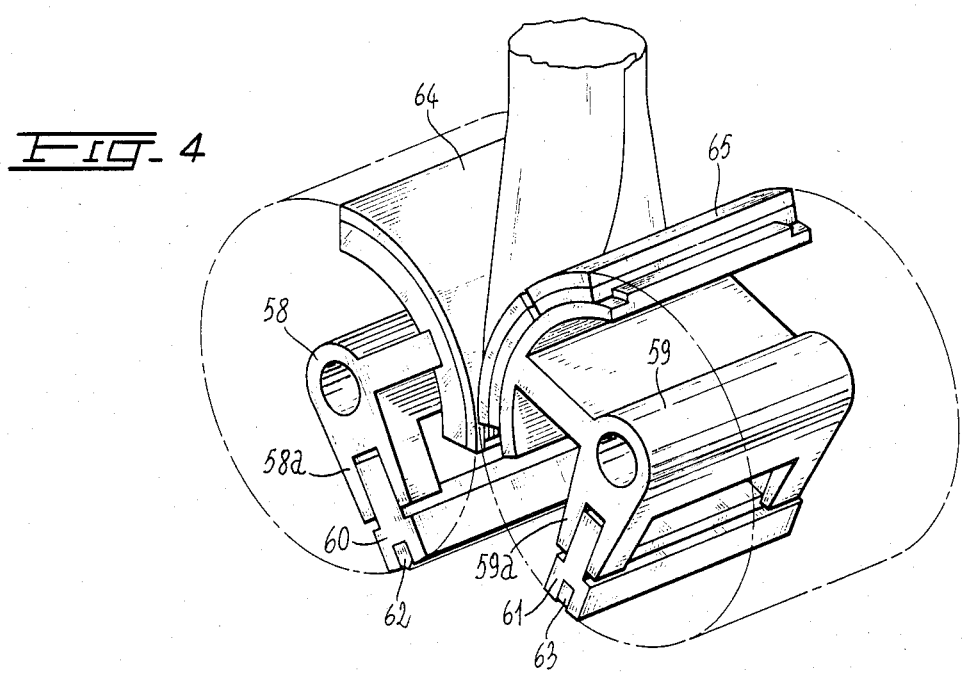

MACHINE FOR MAKING, FILLING AND SEALING BAGS

FIELD OF THE INVENTION

The present invention relates to machines for making, filling and sealing bags.

BACKGROUND OF THE INVENTION

Machines for making, filling and sealing bags, producing the bags from a band of conventionally heat-sealable material and filling them with liquid, pulverulent, or granular and other noncoherent products, are well known.

Machines of the above type, which are used for the above purpose and to which the present invention refers, comprise an operative structure which, extending in the vertical direction, consists essentially of a frame or base and, supported by the base, a vertical mandrel tube and a member in the form of a profiling collar disposed around the said vertical mandrel tube in such manner as to form an annular space, thus producing a kind of drawing device, means for supporting a reel of heat-sealable material and for conveying the said material from top to bottom through the aforesaid annular space between the said profiling collar member and the said vertical mandrel tube, folding it in tubular form around and along the said vertical mandrel tube with its two longitudinal edges superimposed, metering means for the product to be packed, disposed above the said vertical mandrel tube intermittently acting advancing means below the profiling collar member and in contact with the vertical mandrel tube, which advancing means are adapted to pull the said band intermittently downwards along the vertical mandrel tube, the length of each intermittent movement being equal to the length of the bag which it is desired to obtain, heat-sealing means disposed along the vertical mandrel tube at the height of the intermittently acting advancing means and, respectively, below the advancing means, means for the heat-sealing of the superimposed longitudinal edges of the band and heat-sealing across the resulting tube of heat-sealable material during the halt after each intermittent movement, and means adapted to operate alternately the heat-sealing means in periods coinciding with the halts after each intermittent movement.

In these known intermittently operating machines, the intermittently acting advancing means are usually composed of two belts forming a more or less vertically elongated closed ring, the belts being arranged diametrically in relation to the vertical tube. These belts are obviously synchronized relative to one another for the intermittent downward pulling movement of the band folded in tubular form as described above, and a machine of this kind with belt-driven advancing means is known in the trade as an intermittent "caterpillar" feed machine.

Like all machines operating with an intermittent movement, these machines for making, filling and sealing bags, operating intermittently, entail limits of unit productivity, which are due not only to the halt periods of the intermittent operating cycles required for carrying out the operations relating to the formation of the product which it is desired to obtain, but are also due to the inertia forces of the moving parts making up the entire kinematic mechanism intended to achieve this intermittent movement.

Thus, in the case of intermittent cycle machines of the type in question, which include a welding phase dependent, as is known, not only on pressure and temperature but also on the contact times of the welding means on the heat-sealable material, a technical functional and commercial feature which should not be overlooked is the complex construction required for the welding means for effecting the welding when the operating speed of the machine in question changes.

OBJECTS OF THE INVENTION

The main object of the present invention is that of obviating the disadvantages inherent in machines operating with an intermittent movement, by providing a machine for making, filling and sealing bags containing liquid, pulverulent, or granular and other incoherent products, which operates with a continuous movement.

Another object of the present invention is that of providing, in conformity with the previously mentioned object, a machine of this kind which operates with a continuous movement and in which, when the rate of unit productivity varies, the time of welding contact between the welding means and the heat-sealable material for the formation of the bags also varies as required.

Yet another object of the present invention is that intended, in conformity with the previously mentioned objects, also to make it possible to provide a wide range of dimensions of bags by means of a simple adjustment operation.

A further object of the present invention is that of achieving, in conformity with the previously mentioned objects, a large packing capacity for the product in order to form practically completely filled bags, thus saving packing material.

Yet another, and by no means the least important, object of the present invention is that of producing, in conformity with the previously mentioned objects, a machine assembly of the type and for the purpose mentioned above, which has a particularly simple, efficient and economical construction, particularly in comparison with the high performance which it ensures.

SUMMARY OF THE INVENTION

These and other objects will be more clearly seen from the following description and are all achieved with the machine in accordance with the present invention for making, filling and sealing bags, the latter being obtained from a band of material which is heat-sealable in the usual manner and filling them with liquid, pulverulent, or granular and other incoherent products, which comprises an operating structure extending in the vertical direction and essentially comprising a frame or base and, supported by the base, a vertical mandrel tube and a member in the form of a profiling collar disposed around the vertical mandrel tube in such a manner as to form an annular space, thus producing a kind of drawing device, means for supporting a reel of heat-sealable material and for conveying the material from top to bottom through the aforesaid annular space between the profiling collar member and the vertical mandrel tube, folding it in tubular form around and along the vertical mandrel tube with its two longitudinal edges superimposed, metering means for the product to be packed disposed above the vertical mandrel tube, advancing means below the profiling collar member and in contact with the vertical mandrel tube, which advancing means are adapted to pull the band downwards along the vertical mandrel tube, heat-sealing means disposed along the said vertical mandrel tube for the heat-sealing of the superimposed longitudinal edges of the band and, respectively, below the vertical mandrel tube transversely to the tube of heat-sealable material thus obtained, and means adapted to operate the said heat-sealing means in a cyclic phase. According to the invention the advancing means and the heat-sealing means for heat-sealing transversely to the tube of heat-sealable material are associated with support means controlled by continuous motion operating means below the said vertical mandrel tube, the advancing means comprising two sector members having cylindrical surfaces and contrarotating tangentially to a plane containing the axis of descent of the said tube of heat-sealable material, the continuous motion operating means comprising a cyclic differentiator device transmitting the said motion.

BRIEF DESCRIPTION OF THE DRAWING

Other characteristics and advantages of the machine in accordance with the present invention will become clearer from the following detailed description with reference to the accompanying drawing, in which:

FIGS. 1 and 2 show a machine of this kind in a front view in perspective and in a rear view in perspective respectively, with some parts removed and others in section, so that other parts can be seen more clearly, and FIGS. 3 and 4 show in perspective, on a larger scale, the advancing means and the transverse heat-sealing means in accordance with the present invention, in two different operating positions.

SPECIFIC DESCRIPTION

Figure 1:
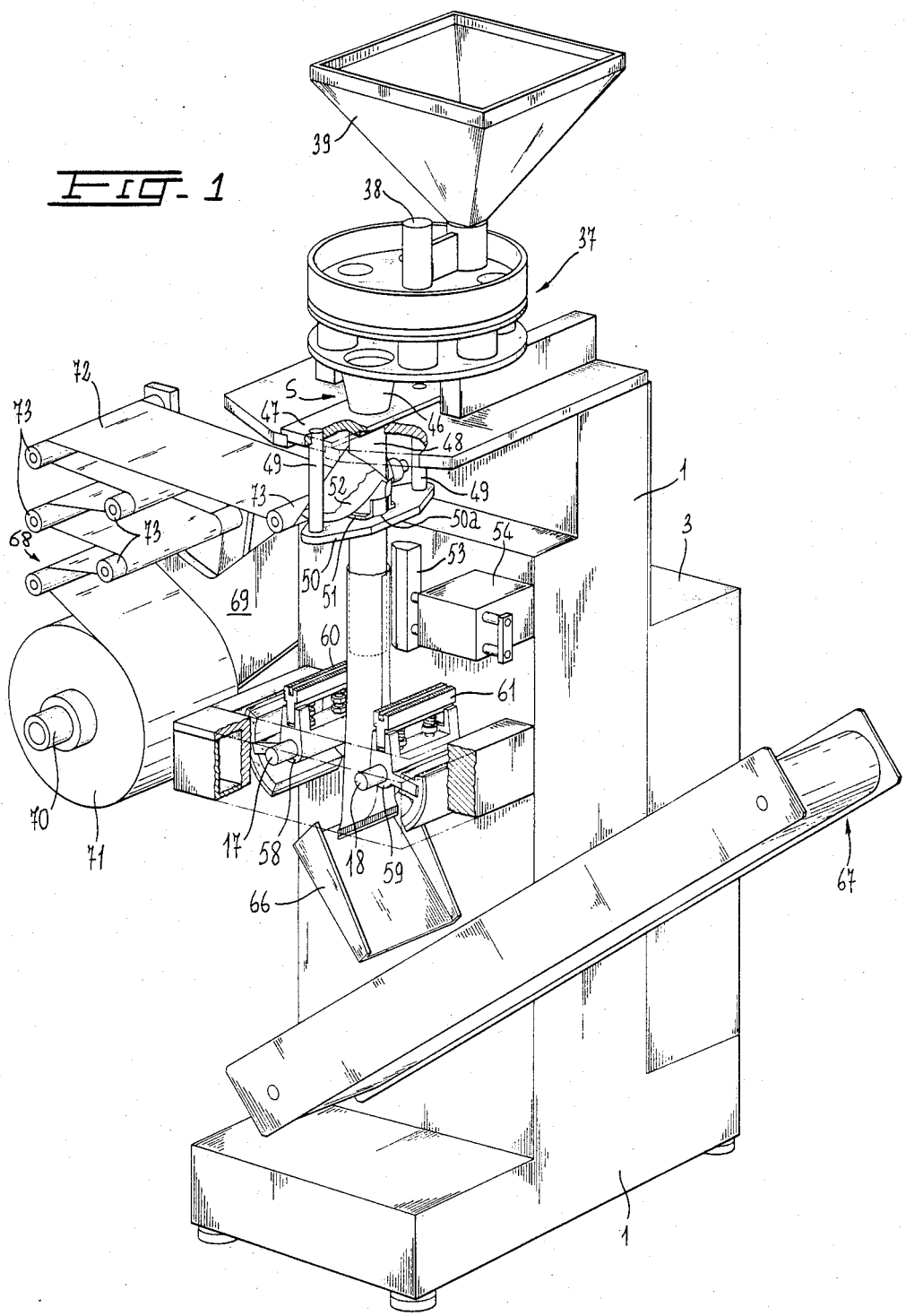

Referring to these drawings, and in particular to FIGS. 1 and 2, it can be seen that the machine in question comprises a frame or base 1 extending in the vertical direction in the form of a rear cabinet, with a central horizontal cross member 2, the cabinet being closed by a removable wall 3.

On the bottom of the rear cabinet is fixed an electric motor 4, on whose drive shaft 5 is keyed a pulley 6, around which runs a transmission belt 7, which also passes around a pulley 8 of a reduction gear unit 9 also fixed on the bottom of the cabinet. On the output shaft 10 of the gear unit 9 is keyed a chain wheel 11, around which passes a chain 12 for the transmission of the movement to a shaft 13, supported by the previously mentioned horizontal cross member 2, through a corresponding chain wheel 14 keyed on that end of the shaft 13 which extends furthest into the interior of the cabinet. On the shaft 13 are also keyed a second chain wheel 15 and a gear 16 having helically inclined teeth.

Parallel to the shaft 13, three other shafts 17, 18 and 19 are supported by the cross member 2, the shafts 17 and 18 being extended forward through the front wall of the base 2 (see FIG. 1). A straight-toothed gear 20 is keyed on the shaft 17, while on the shaft 18 are keyed a likewise straight-toothed gear 21 meshing with the gear 20, a chain wheel 22, a likewise straight-toothed gear 23, while the shaft 18 also carries a loose gear 24 meshing with the gear 16 and having a larger axial dimension than the latter for reasons which will become clear later on; on the shaft 19 are mounted a gear 25 meshing with the gear 23 and a gear 26 having helically inclined teeth and meshing with the loose gear 24, which has a larger axial dimension and is fixed to a cam member 27 rotatable with but slidable on the said shaft 19.

In the groove 27a in the cam member 27 is engaged a roller 28 carried loose by an arm 29 fixed on the cross member 2.

The movement of the shaft 13 through the action of the chain wheel 15 is transmitted via a transmission chain 30 to a chain wheel 31 mounted loose on a shaft 32 carried for horizontal rotation in known manner by the top part of the base 1 of the machine. This chain wheel 31 is fixed to a part of a clutch of known type, for example a front-toothed clutch 33, the other part of which is slidably keyed on the shaft 32, on which is also keyed a bevel gear 34 meshing with a bevel gear 35 which in turn is keyed on the bottom end of a vertical shaft 36 forming part of a kinematic mechanism of known type (and therefore not shown) for transmitting the intermittent movement to a metering device 37 supported by means of a vertical shaft 38 in the top part of the base 1 of the machine, the said metering device likewise being of known type and therefore not further described. Above the said metering device 37 is disposed a conventional hopper 39 feeding the metering device 37 with material which is to be bagged. A roller 40 cooperates with the annular groove 33a formed in the part of the said known clutch 33 which is slidably keyed on the shaft 32, this roller being carried loose by one end of a lever 41 pivoted at its intermediate point 42 on a support 43 carried as a fixed bracket by the base 1 of the machine. At the other end of this lever 41 is pivoted one end of a connecting rod 44, whose other end is pivoted on a fork on the armature or core of an electromagnet 45 fixed on the said bracket support 43.

In a position corresponding to a station S where the metering compartments or chambers 37a for the product which is to be packed are halted by the metering device 37 for the purpose of feeding the batches which are about to be packed, a funnel member 46 is provided, which is carried by a fixed plate 47 projecting forwards from the top part of the base 1 of the machine. Below this funnel member 46, the fixed plate 47 carries a tubular member or tube 48 extending downwards to a point near the shafts 17 and 18, after the style of a vertical mandrel, as will be seen more clearly further on. This fixed plate 47 carries, below it and in a position diametrically opposite the vertical mandrel tube 48 (see FIG. 1), two vertical rods 49, to the bottom ends of which is fixed a plate 50 provided with a hole 50a through which the said vertical mandrel tube 48 passes and around which is disposed a tubular support member 51 fixed to the said plate 50 and associated with a member 52 in the form of a profiling collar. The combination of this profiling collar member 52 and the tubular support member 51 with the said vertical mandrel tube 48 results in the formation of an annular space, thus forming a kind of drawing means, as will be seen more clearly further on.

On one side—the right-hand side in FIG. 1—of the vertical mandrel tube 48 is disposed a vertical welding element 53 of known type, which is operated in a reciprocating movement by a kinematic mechanism, which is also of known type and which is contained in a casing 54 fixed on the front face of the base 1 of the machine and leading to a shaft 55 (see FIG. 2) provided with a chain wheel 56 operated by a transmission chain 57 passing around the said chain wheel 56 and around the previously mentioned chain wheel 22 keyed on the shaft 18.

On the part of the previously mentioned shafts 17 and 18 which are extended to the front of the base 1 of the machine are keyed support members designated 58 and 59 respectively. These support members 58 and 59 are each provided with two radial arms designated respectively 58a, 58b and 59a, 59b. On the radial arms 58a and 59a is mounted a respective horizontal welding member 60, 61 of known operating construction type having a cutting blade member or knife 62 in combination with the welding member 60 and with a counter-blade or counter-knife member 63 in combination with the welding member 61. Respective sectors 64 and 65 having cylindrical surfaces are on the other hand mounted on the radial arms 58b and 59b. These sectors 64 and 65 having cylindrical surfaces obviously contrarotate through the action of the direct coupling of the gears 20 and 21 keyed on the said shafts 17 and 18, and their radial distances from the respective rotating shafts, and also from the previously mentioned welding members 60 and 61, are such that they contrarotate on a peripheral path tangential to the plane parallel to the respective axis of contrarotation and containing the axis of the vertical mandrel tube 48 (see also FIGS. 3 and 4). The external contact surface of these sectors having cylindrical surfaces, designated 64 and 65, is of a known type suitable for effecting the feeding of any packing material, and at least one of them—in the case illustrated the surface of the sector 65—is also provided with an adjustable structure, in known manner, so that its circumference can be increased or reduced in size for the reasons explained later on (see FIGS. 3 and 4).

Below the vertical mandrel tube 48, at a lower level than that of the bottom part of the path described by the cylindrical sectors 64 and 65 and by the horizontal welding members 60 and 61, is disposed a chute member 66 for delivering the products obtained with the machine in question to an endless belt conveyor indicated generally by the reference 67, which conveys the products to subsequent processing stages, for example for gathering or packing in groups in cartons, and the like.

On the left-hand side of the machine, referring to FIG. 1, a system of known type is provided, which is given the general reference 68, for feeding packing material. This known system 68 for feeding packing material is supported by a support member 69 (see FIG. 2) fixed to the base 1 of the machine and comprises substantially a shaft 70 carrying a reel 71 of such packing material 72 in band form, and guide and feed rollers 73 for the band 72 for feeding the material to the previously mentioned annular drawing means formed by the combination of the vertical mandrel tube 48 and the profiling collar member 52.

A continuously working machine corresponding to this description operates in the following manner:

The band 72 of packing material from the reel 71 is fed by passing over the guide and feed rollers 73, so as to pass above the profiling collar member 52 and then through the annular space formed between the said profiling collar member 52 and the vertical mandrel tube 48, so as to be folded in tubular form around and along the vertical mandrel tube 48, with its two longitudinal edges superimposed (see in particular FIG. 1), being intermittently advanced by the cylindrical sectors 64 and 65 operated in a continuous contrarotating movement by means of the kinematic mechanism described above with reference to FIG. 2 in particular (see also FIG. 4).

The size of the cylindrical surfaces of the sectors 64 and 65, which as stated above is adjustable, determines the length of the packing or bag which it is desired to obtain.

Following the feeding phase of the two sectors 64 and 65 in a continuous contrarotating movement, the metering device 37 causes one of its metering chambers 37a to stop in a position corresponding to the station S above the funnel member 46, thus discharging the batch of product to be packed through the said funnel member 46 and the vertical mandrel tube 48 to the interior of the tube of packing material, the product resting on the bottom formed by a previously made transversal weld, before the weld which will now be described (see FIG. 2 again), and then the welding members 53 come into operation to make the longitudinal weld on the two superimposed longitudinal edges of the band folded in tubular form, in conjunction with the oppositely disposed welding members 60 and 61, which first by their downstream edge facilitate the packing of the product and then effect the transverse welding and the cutting of the tube of material, in order to separate the downstream part in the form of a filled and sealed bag 74 (see FIG. 3).

As mentioned above, a machine of this kind, operating with continuous motion, is able to vary the contact time required for the heat-sealing of the packing material, when its speed of unit production varies. By means of the groove 27a in the cam member 27, this groove being suitably dimensioned in accordance with a determined range of lengths of the bags which it is desired to obtain, and with the aid of the loose roller 28 engaged therein and as the result of the continuous rotational movement transmitted to it by the gear 24, the said cam member 27 and consequently the gear 26 are caused to slide axially on the support shaft 19, in such a manner that the said gear 26, following by its helical teeth during this movement along the helical teeth of the said gear 24, is slowed down, and consequently the gear 25 transmitting the movement to the shafts 17 and 18 is also slowed down, thus increasing the time of contact between the welding members and the heat-sealable packing material.

As a result, as will be observed, the invention fully achieves the predetermined aims. In particular, the machine is able to attain a high speed of operation, which is far greater than that of machines used at present for the same purpose.

In the practical application of the invention it is obviously possible to make any modifications and variations resulting from the scope of the protection provided by the claims given below. The vertical construction described above and the fact that it is possible to adjust the required welding time when the unit production speed of the machine varies have been found particularly interesting in practice.

I claim:

1. In a machine for making, filling and sealing bags, the latter being obtained from a band of material which is heat-sealable in the usual manner, and filling them with liquid, pulverulent, or granular and other noncoherent products, which comprises an operating structure extending in the vertical direction and including base, a vertical mandrel tube on said base and a profiling collar disposed around said mandrel tube to form a drawing device, means for supporting a reel of heat-sealable material and for conveying said material from top to bottom through the aforesaid annular space between said profiling collar member and said mandrel tube, folding said material in tubular form around and along said vertical mandrel tube with two longitudinal edges superimposed, metering means for a product to be packed disposed above the vertical mandrel tube, advancing means below said profiling collar member and in contact with the said mandrel tube for pulling said band downwards along said vertical mandrel tube, heat-sealing means disposed along said mandrel tube for the heat-sealing of the said superimposed longitudinal edges of the band and below said mandrel tube transversely to the tube of heat-sealable material thus obtained, and means adapted to operate said heat-sealing means in a cyclic phase, the improvement wherein said advancing means and the said heat-sealing means for heat-sealing transversely to the tube of heat-sealable material are associated with support means controlled by continuous motion operating means below the said vertical mandrel tube, the advancing means comprising two sector members having cylindrical surfaces and contrarotating tangentially to a plane containing the axis of descent of the said tube of heat-sealable material, the said continuous motion operating means comprising a cyclic differentiator device, said cyclic differentiator device comprising a first gear having helically inclined teeth meshing with a loose gear having corresponding teeth and of greater axial dimension forming part of said continuous motion operating means, a cam member fixed to said first gear, and a second gear, the said first gear and the said cam member being slidably keyed on the shaft on which the said second gear is keyed, a roller carried loose by fixed support means being engaged in the operating groove of said cam member.

2. The improvement defined in claim 1 wherein said support means are composed of two members provided with two radial arms, a respective sector member having a cylindrical surface being associated with one of the arms of each of said members of said support means, and a respective heat-sealing member being associated with the other arm of each of said members of said support means.

3. The improvement defined in claim 2 wherein at least one of the said sector members having cylindrical surfaces is of adjustable construction, its circumference being able to be increased and decreased in size.

* * * * *